United States Patent Office 3,476,565
Patented Nov. 4, 1969

3,476,565
NUTRIENT BLOCKS CONTAINING GUM ARABIC
Philip Carlton Anderson and Janet Lorraine Cooper Rapp, Crete, Nebr., assignors to Feed Service Corporation, Crete, Nebr., a corporation of Nebraska
No Drawing. Filed Oct. 8, 1965, Ser. No. 494,252
Int. Cl. A23k 1/00
U.S. Cl. 99—2
10 Claims

ABSTRACT OF THE DISCLOSURE

Gum arabic has the unique value of improving the physical characteristics and palatability of animal feed supplements in block form. The blocks contain an edible waxy solid, and a single nutritive-substance. Where the nutritive is cationic metallic, it is present in the form of a saliva-soluble chelate of citric acid or a saliva-soluble mixture of the nutritive element, in the form of an oxide, hydroxide or carbonate, and a water-soluble citric acid compound. Where the nutritive substance is nonmetallic, there is also present an edible, aliphatic, hydroxy acid having 4 to 6 carbon atoms, such as citric acid.

This invention relates to animal nutrition and particularly to compositions for supplying animals with nutritive elements and to methods for the preparation of such compositions.

Valuable domestic and wild animals have a taste sensory system which enables the animal to select the food necessary for adequate nutrition. Such selection depends, among other things, on the animal having a sufficiently wide choice available. Natural foodstuffs are variable mixtures of nutritive elements which the animal is capable of evaluating quantitatively by his taste sensory system. Prior to consumption, the animal is unable physically to separate wanted elements from those unwanted in such mixtures. Additionally, the animal cannot identify highly insoluble compounds. The result, therefore, is a less-than-optimum diet.

It is common practice today to feed animals supplemental feedstuffs, or completely mixed rations, which have been fortified with a quantity of nutritive elements. The amount of such elements supplied may be far more or far less than the requirements of the particular animal. Consequently, it is not believed to be possible to make an ideal supplement containing a plurality of elements which, when added to forages and grains whose chemical compositions vary widely, will result in an optimum ration. In addition, the optimum amounts of such elements have not been determined with any degree of certainty. The quantity needed varies from one animal to the next, depending on the animal's nutritional status at the time of feeding. The result of this usual procedure of supplementation is sometimes wasteful in material and is far from satisfactory, since the optimum quantity of each element needed is properly received only by a small number of the animals fed.

It has been previously suggested to use the taste sensory system for feeding animals. The various methods suggested for accomplishing this result have been far from effective because of the difficulties involved. The compositions containing the nutritive elements must be supplied to the animal in a tasteful form. Yet, the compositions cannot be so tasteful that they will be consumed by the animal beyond its needs. The elements must also be in a form capable of easy consumption by the animal and, at the same time, have resistance to the weather. The compositions must also be resistant to fungal attacks. The desirability and difficulties of having a composition which can satisfy all or even most of this wide range of requirements are thus readily apparent.

It has been found that the nutritive elements, although they can be incorporated in a binder and then molded into blocks, do not yield the desired results. In this connection, it should be kept in mind that the nutrient blocks, when licked by the animal, must yield the nutritive element in soluble form so that the animal will taste it and continue ingesting it.

This objective, to our knowledge was never achieved before the invention described and claimed by one of us in U.S. Patent No. 3,198,635. Prior thereto, for example, it had been found that the oxides, hydroxides, carbonates and phosphates of transitional elements, i.e., those with atomic numbers 22–30, inclusive, are highly insoluble in water. Irrespective of the binder used, these compounds are generally refused by the animals. The more strongly acid salts, such as the sulfates and chlorides, although they, too, can be incorporated in a binder, cannot be used successfully, because they are strongly deliquescent and/or efflorescent, resulting in poor weathering characteristics. In addition, the use of such salts inevitably permits the accumulation of insoluble carbonates and/or metal soaps on the surface of the blocks, due to licking of the block by the animal. This accumulation is self-defeating, and the ability of the animal to taste and continue ingesting the block is inhibited.

In addition, the incorporation of elements such as chlorine, sodium, potassium, sulfur, etc., which are not metabolized to carbon dioxide or water, is undesirable, because, inter alia, the palatability of the nutrient composition may be adversely affected.

In sum, the desired nutrient composition ideally should possess the following properties:

(1) It should contain only one of the elements other than carbon, nitrogen, hydrogen, and oxygen;

(2) It should be of suitable hardness at ambient temperatures so that the animals will lick the composition without engorging on it;

(3) It should be easily hydrolyzed by slightly alkaline saliva;

(4) It should be weatherproof when exposed to the wind, rain, snow, sun, and widely varying conditions of temperatures and humidity;

(5) It should contain only the desired nutritive element plus, if desired, organic substances, such as sugar, which can be readily metabolized by living cells to carbon dioxide and water, leaving no unwanted residue;

(6) It should be resistant to oxidation;

(7) It should be resistant to fungal attack;

(8) It should, indeed, be completely acceptable to animals as a source of the nutritive element;

(9) It should not be consumed because of appetite for the organic components; and

(10) It should not, when being consumed, result in a buildup of insoluble carbonates, hydroxides or metal soaps which thereafter make the composition tasteless and unacceptable.

U.S. Patent No. 3,198,635 disclosed compositions which met the foregoing requirements. The compositions disclosed in said patent comprise an intimate mixture of an edible, waxy substance which is solid at ambient temperatures and a member selected from the group consisting of:

(1) A saliva-soluble chelate of citric acid and a nutritive element material, and (2) A saliva-soluble mixture consisting essentially of at least one water-soluble citric acid compound and a nutritive element material selected from the group consisting of a metal oxide, a metal hydroxide and a metal carbonate.

While the compositions made in accordance with U.S. Patent No. 3,198,635 do in fact possess the desirable aforementioned properties and others, and have already been extensively and successfully employed on a large scale in the U.S.A., there still remaining a gap in the nutritional armamentarium, as the nutritive elements to which said patents teachings applied are metallic nutrients, i.e., those elements which can be chelated, as a cation, with citric acid. Examples of such elements are iron, cobalt, nickel, magnanese, copper, zinc, calcium and magnesium.

As is recognized by those skilled in the art of scientific animal husbandry, there are other important nutritional materials besides the metallic nutrients. Such other materials include oily substances and water soluble materials.

Such oily substances and water soluble materials, when used in place of metallic nutrients, do not yield compositions having the desired practical value when made into blocks in accordance with the teachings of U.S. Patent No. 3,198,635. For example, such blocks, because of inadequate physical properties, including insufficient binding of the nutrients and actual deterioration in use, expand and crack. Also, such blocks prepared under conditions of high temperature and high humidity are unsatisfactory.

Accordingly, it is an important object of this invention to prepare compositions made from oily and water soluble nutrients such that the compositions possess the attributes and practical utility of the metallic nutrient containing compositions made in accordance with the teachings of U.S. Patent No. 3,198,635.

We have succeeded in accomplishing the afoersaid object and others, in accordance with this invention by the addition of gum arabic and an edible, aliphatic hydroxy acid, containing from four to six carbon atoms, to compositions containing nonmetallic nutrients and otherwise made in accordance with U.S. Patent No. 3,198,635.

It has also been unexpectedly found that the addition of gum arabic also improves the properties of metallic nutrient containing compositions made in accordance with U.S. Patent No. 3,198,635. We have discovered that animals prefer to eat nutrient blocks otherwise made in accordance with U.S. Patent Number 3,198,635, but with gum arabic added thereto, compared with the same nutrient blocks without gum arabic, when both types are offered side by side, each separately, free choice. We do not know why animals exhibit this preference, since they do not shown any appetite at all for a simple gum arabic—wax mixture.

The findings of the invention were unexpected and unobvious. For one thing, gum arabic is the sole substance or mixture of substances out of the many which we have tried which is suitable for the purposes of this invention. Among other substances we have tested and found unsatisfactory as substitutes for gum arabic are water soluble carbohydrates such as sugars, starch, pectins, guar gum, ghatti gum, karaya, chitin, pure cellulose, carboxymethyl cellulose, algin, carrageenan, tragacanth, dextrans, dextrin, corn hull gum, hydroxyethyl cellulose, and tamarind gum.

We are unable to account for the reason why gum arabic is uniquely suited for the purpose of this invention. Indeed, gum arabic is a colloidal material known to exhibit swelling and act as a disintegrator of compositions in tablet form. Consequently, it would have been expected that blocks made in accordance with our present invention would disintegrate in use, particularly in the presence of citric acid compounds, as the latter are known to enhance the swelling tendency.

Another unexpected aspect of our present invention is that the aforementioned hydroxy acids are required to achieve the purposes of this invention when nonmetallic nutrients are used. In this conection, it is to be noted that although citric acid was employed in accordance with the teachings of U.S. Patent No. 3,198,635, it served in such a manner as to be uniquely required; whereas, it has been found that not only citric acid but certain other hydroxy acids can be used in accordance with the present invention, thereby showing that the particular function of the citric acid as used in the invention of U.S. Patent No. 3,198,635 is not the same as that of the same acid as used herein.

In general, the processes for preparing the compositions of this invention comprise bringing the aforementioned ingredients into intimate contact with each other. With respect to the preparation of compositions containing metallic nutrients, the processes set forth in U.S. Patent No. 3,198,635, modified by adding gum arabic, are applicable. With respect to compositions containing nonmetallic oily and water soluble nutrients, we prefer to mix the nutrients with gum arabic; the resulting mixture is then mixed with the waxy substance and the hydroxy acid with or without the ammonium salt of such acid, and then pressed into tablets (i.e. blocks) as in U.S. Patent No. 3,198,635. If desired, a mixture of the gum arabic, nonmetallic substance, and hydroxy acid, with or without the aforementioned ammonium salt, may be dispersed in the melted waxy substance, and the resulting composition then poured into molds and cooled.

The resulting bolcks of this invention may be fed, free choice, to animals and used in the same means described in U.S. Patent No. 3,198,635.

The metallic nutritive substances useful herein are those disclosed in U.S. Patent No. 3,198,635.

The oily nutrients useful herein include any edible, vitaminic, oil soluble alcohols and/or their esters, having carbon chain lengths of about 20 to 40 atoms, preferably in the form of concentrated suspensions in vegetable oils. Specific examples of such oily nutrients include vitamin A almitate (in corn oil, 1,500,000 I.U. per gram, retinol); vitamin $D_3$ (1,000,000 I.U. per gram, in soybean oil, ergosterol); vitamin $D_2$ (3,000,000 I.U. per gram in corn oil, calciferol); vitamin E acetate (900 I.U. per gram in cottonseed oil, tocopherol); and pure vitamin $K_1$. Other examples include vitamin $K_1$ in corn oil as a 75% solution and Beta carotene 1,000,000 I.U. per gram dissolved in corn oil.

The water soluble nutrients useful herin are the various compounds found in the B-vitamin complex, ascorbic acid, and the anionic nutrients, required in amounts of less than about 500 parts per million in the total animal ration on a dry matter basic, their ammonium salts or their edible organic complexes.

Specific examples of such water soluble nutrients include ethylenediamine dihydriodide, ammonium iodide, boric acid, ammonium selenate, ammonium molybdate, and B complex vitamins, such as riboflavin, thiamine, nicotinic acid, folic acid, pyridoxine, pantothenic acid, biotin, erythotin, paraminobenzoic acid and inositol.

The edible waxy materials used in accordance with this invention are fatty acids, their esters and alcohols which have a carbon chain length from about 14 to about 20 atoms per molecule.

In general, any edible waxy material which is solid at ambient temperatures may be used. Such materials which melt within the range from about 50° C. to about 80° C. are preferred as far as it presently known. The wax can be one of these compounds along, or it can be a mixture of these compounds. A presently preferred waxy material is that known and marketed in the U.S.A. as food grade stearic acid, double pressed. The composition of this product as purchased on the market has been found to be as follows:

| | Percent |
|---|---|
| Stearic acid | 39.0 |
| Palmitic acid | 52.0 |
| Oleic acid | 4.0 |
| Myristic acid | 2.5 |
| Margaric acid | 2.0 |
| Pentadecylic acid | 0.5 |

Specific examples of operable, edible, aliphatic hydroxy acids include glycolic acid, malic acid, tartaric acid, citric acid, gluconic acid and saccharic acid.

It has been found that from about ½ to about 70 percent, by weight, of gum arabic, based on the total weight of the composition, yields satisfactory results. We presently prefer to employ amounts from about 5 percent to about 25 percent, on the same basis, except in compositions containing metallic nutrients, in which case we prefer to use from about 5 to about 10 percent of gum arabic, on the same basis.

The percentages of the other ingredients in the compositions made in accordance with the present invention will now be given. As is the case of gum arabic, the percentages are by weight of the total composition.

It has been found that the amount of waxy substance in the total nutrient composition may be from about 15 to 60 percent, preferably, about 25 to 35 percent.

The amount of oil soluble nutrient may be from about ½ to 10 percent of the block, preferably, about 2 to 3 percent.

The amount of the water soluble nutrient may be from about ½ to 25 percent, preferably about 12 to 18 percent.

The amount of the hydroxy acid, including or excluding the corresponding ammonium salt, may be from about 1 to 60 percent, preferably, about 35 to 45 percent. The ammonium salt is normally used in the same amount as its corresponding hydroxy acid, but may be used in smaller or larger relative amounts.

The compositions and blocks of this invention may contain additional ingredients, as disclosed in U.S. Patent No. 3,198,635. The present compositions and blocks possess substantially the same characteristics, such as pH, appearance, stability, palatibility, weather resistance, etc., and are used in substantially the same manner and with substantially the same results as described in said patent. The feeders referred to in said patent are now covered by U.S. Patent No. 3,200,790, also issued to one of us.

In order to more fully clarify our invention, we give the following examples, for purposes of illustration. The parts mentioned therein are in parts by weight, unless otherwise specifically stated.

All of the blocks made in accordance with the following examples were presented to the animals as described in U.S. Patent No. 3,198,635. It was found in all cases that the animals consumed optimal amounts of nutrients required by each animal, and the blocks all possessed the aforementioned advantageous properties, e.g., weather resistance, stability, palatability, and solubility in animal saliva.

EXAMPLE 1

A nutrient block was prepared from the following materials:

| | Grams |
|---|---|
| Vitamin A palmitate in corn oil having 1,500,000 units per gram | 16 |
| Gum arabic | 184 |
| Food grade stearic acid | 240 |
| Ammonium citrate | 200 |
| Citric acid | 160 |

The vitamin A palmitate was absorbed upon the gum arabic, the suspension was stirred with the ammonium citrate and citric acid into stearic acid in a finely divided state to obtain a uniform dry mixture, and the resulting mixture simply pressed together to form an integral mass. A tableting press was used to form tablets of about 10 cm. diameter by 3⅓ cm. in thickness. Pressures of the order of about 2,000 to 3,000 pounds per square inch were employed to form the tablets. The speed of formation of the tablets is, desirably, 6 tablets per minute when using a standard production model punch press. Nutrient blocks of a convenient size to be offered to animals were formed by dipping the tablets in melted stearic acid and stacking three tablets over a disc of plywood about 2 cm. thick and of the same diameter as the individual tablets. Upon cooling the stack of three tablets and plywood united to form the nutrient block which was fed in a feeder as described in U.S. Patent No. 3,200,790.

The pH of this block was 3.3. The color was pale yellow. The melting point was 68° C.

An alternate method was as follows:

The vitamin A palmitate, gum arabic, citric acid and ammonium citrate were stirred thoroughly together, until a homogenous, dry suspension was obtained. The food grade stearic acid was heated to 80° C. until melted. It was allowed to cool for 20 to 30 minutes at room temperature, so that no extra heat was retained but the stearic acid was still in liquid form, whereupon the vitamin A, gum arabic, citric acid and ammonium citrate were thoroughly admixed and the resulting mixture poured into appropriate paper molds the size of the holes described in U.S. Patent No. 3,200,790.

EXAMPLE 2

A nutrient block was prepared from the following materials:

| | Grams |
|---|---|
| Vitamin $D_2$ in corn oil having 3,000,000 units per gram | 4 |
| Gum arabic | 186 |
| Food grade stearic acid | 240 |
| Citric acid | 130 |
| Ammonium citrate | 240 |

The vitamin $D_2$ in oil was thoroughly stirred into the gum arabic until a dry homogeneous suspension was obtained. This was thoroughly mixed with the food grade stearic acid, citric acid and ammonium citrate and made into blocks with a tableting press as described in the method of Example 1. The pH of this block was 3.6. The color was off-white, and the melting point was 68° C.

EXAMPLE 3

A nutrient block was prepared from the following materials:

| | Grams |
|---|---|
| Vitamin $D_3$ in corn oil having 1,000,000 units per gram | 4 |
| Gum arabic | 40 |
| Food grade stearic acid | 480 |
| Citric acid | 110 |
| Ammonium citrate | 166 |

The vitamin $D_3$ in oil was thoroughly stirred into the gum arabic until a dry homogeneous suspension was obtained. This was thoroughly mixed with the food grade stearic acid, citric acid and ammonium citrate and made into blocks with a tableting press as described in the alternate method of Example 1. The pH was 3.6. The color was white, and the melting point was 65° C.

EXAMPLE 4

A nutrient block was prepared from the following materials:

| | Grams |
|---|---|
| Vitamin E acetate in corn oil, 900 units per gram | 80 |
| Gum arabic | 156 |
| Stearic acid | 402 |
| Citric acid | 62 |
| Ammonium citrate | 100 |

The vitamin E in oil was thoroughly stirred into the gum arabic to obtain a dry homogeneous powder. This was thoroughly mixed with the food grade stearic acid, citiric acid and ammonium citrate and made into blocks with a tableting press as described in the method of Example 1. The pH was 3.4. The color was tan, and the melting point was 65° C.

EXAMPLE 5

A nutrient block was prepared from the following materials:

| | Grams |
|---|---|
| Ethylenediamine dihydriodide | 100 |
| Gum arabic | 200 |
| Food grade stearic acid | 240 |
| Citric acid | 150 |
| Ammonium citrate | 110 |

The five dry ingredients were thoroughly mixed together and made into blocks with a tableting press as described in the alternate method of Example 1. The pH of this block was 3.0. The color was off-white, and the melting point was 68° C.

EXAMPLE 6

A nutrient block was prepared from the following materials:

| | Grams |
|---|---|
| Vitamin A palmitate in soybean oil having 1,000,000 units per gram | 24 |
| Gum arabic | 100 |
| Myristic acid wax | 480 |
| Citric acid | 74 |
| Ammonium citrate | 122 |

The vitamin A palmitate was absorbed on the gum arabic and stirred until homogeneous. This, in turn, was mixed with the myristic acid wax, citric acid and ammonium citrate. The resulting composition was made into blocks with a tableting press as described in the method of Example 1. The pH was 3.7. The color was lemon yellow, and the melting point was 68° C.

EXAMPLE 7

A nutrient block was prepared from the following materials:

| | Grams |
|---|---|
| Boric acid | 80 |
| Gum arabic | 160 |
| Food grade stearic acid | 480 |
| Citric acid | 30 |
| Ammonium citrate | 50 |

All five dry ingredients were stirred together and made into blocks by means of a tableting press. The pH was 3.8. The color was off-white, and the melting point 65° C.

EXAMPLE 8

A nutrient block was prepared from the following materials:

| | Grams |
|---|---|
| Ammonium selenate | 100 |
| Gum arabic | 200 |
| Food grade stearic acid | 400 |
| Citric acid | 25 |
| Ammonium citrate | 75 |

The ammonium selenate and the gum arabic was thoroughly admixed, and the stearic acid, citric acid and ammonium citrate were blended into the two components. This block was made in a tableting press as described in Example 1. The pH was 4.1. The color was off-white, and the melting point was 68° C.

EXAMPLE 9

A nutrient block was prepared from the following materials:

| | Grams |
|---|---|
| Riboflavin, one of the B complex vitamins | 80 |
| Gum arabic | 400 |
| Food grade stearic acid | 240 |
| Citric acid | 30 |
| Ammonium citrate | 50 |

The gum arabic and riboflavin were thoroughly blended, followed by the addition of stearic acid, citric acid and ammonium citrate to obtain a homogeneous mixture. This block made a tableting press as described in Example 1. The pH was 3.7. The color was rust, and the melting point was 60° C.

EXAMPLE 10

A nutrient block was prepared from the following materials:

| | Grams |
|---|---|
| Vitamin A palmitate in soybean oil containing 1,000,000 units per gram | 8 |
| Gum arabic | 560 |
| Food grade stearic acid | 120 |
| Citric acid | 40 |
| Ammonium citrate | 72 |

The gum arabic was used to absorbed the vitamin A as previously described, and then the stearic acid, citric acid and ammonium citrate were admixed. This block was made in a tableting press as described in Example 1. The pH was 3.5. The color was off-white, and the melting point was 68° C.

EXAMPLE 11

A nutrient block was prepared from the following materials:

| | Grams |
|---|---|
| Vitamin $D_3$ in oil having 1,000,000 units per gram | 8 |
| Gum arabic | 32 |
| Food grade stearic acid | 480 |
| Citric acid | 112 |
| Ammonium citrate | 168 |

The stearic acid was melted as described in the alternate method of Example 1; the gum arabic was used to absorb the vitamin $D_3$; citric acid and ammonium citrate were added; the latter composition was added to the cooled but still liquid stearic acid; after complete stirring, the composition was poured into a mold as further described in Example 1. The pH was 3.5. The color was white, and the melting point was 68° C.

EXAMPLE 12

A nutrient block was prepared from the following materials:

| | Grams |
|---|---|
| Vitamin E in corn oil having 900 units per gram | 80 |
| Gum arabic | 480 |
| Good grade stearic acid | 160 |
| Citric acid | 80 |

The vitamin E was absorbed by the gum arabic and the resulting homogeneous powder was thoroughly admixed with food grade stearic acid and citric acid and ammonium citrate. The block was made with a tableting press as described in Example 1. The pH was 2.6. The color was tan, and the melting point was 63° C.

EXAMPLE 13

A nutrient block was prepared from the following materials:

| | Grams |
|---|---|
| Ammonium selenate | 160 |
| Gum arabic | 440 |
| Food grade stearic acid | 120 |
| Citric acid | 32 |
| Ammonium citrate | 48 |

All five ingredients were thoroughly admixed, and a block was made with a tableting press as previously described. The pH was 4.1. The color was off-white, and the melting point was 63° C.

EXAMPLE 14

A nutrient block was prepared from the following materials:

| | Grams |
|---|---|
| Vitamin A palmitate in corn oil containing 1,500,000 units per gram | 16 |
| Gum arabic | 224 |
| Stearyl alcohol | 480 |
| Citric acid | 32 |
| Ammonium citrate | 48 |

Gum arabic and the vitamin were completely admixed before citric acid, ammonium citrate and stearyl alcohol were, in turn, added and admixed. The block was made by pressing with a tableting machine as previously described. The pH was 3.6. The color was pale yellow, and the melting point was 63° C.

EXAMPLE 15

A nutrient block was prepared from the following materials:

| | Grams |
|---|---|
| Vitamin A palmitate in soybean oil containing 1,000,000 units per gram | 16 |
| Gum arabic | 184 |
| Food grade stearic acid | 240 |
| Citric acid | 360 |

The vitamin A was mixed with the gum arabic to form a dry homogeneous powder, and then the stearic acid and citric acid were thoroughly admixed. The block was made with a tableting press as previously described. The pH was 1.7. The color was lemon yellow, and the melting point was 68° C.

EXAMPLE 16

A nutrient block was prepared from the following materials:

| | Grams |
|---|---|
| Vitamin $D_2$ in cottonseed oil having 3,000,000 units per gram | 8 |
| Gum arabic | 32 |
| Cetyl alcohol | 480 |
| Citric acid | 112 |
| Ammonium citrate | 168 |

The oil, gum arabic, citric acid and ammonium citrate were admixed before adding to the melted and cooled cetyl alcohol. The resulting mixture was poured into molds as described in the alternate method of Example 1. The pH was 3.6. The color was white, and the melting point was 65° C.

EXAMPLE 17

A nutrient block was prepared from the following materials:

| | Grams |
|---|---|
| Vitamin E in corn oil having 900 units per gram | 24 |
| Gum arabic | 560 |
| Cetyl palmitate | 120 |
| Tartaric acid | 48 |
| Ammonium tartrate | 48 |

The vitamin E and gum arabic were thoroughly admixed before further admixing with cetyl palmitate, tartaric acid and ammonium tartrate. The block was prepared using a tableting press as described in Example 1. The color was tan, and the melting point was 57° C.

EXAMPLE 18

A nutrient block was prepared from the following materials:

| | Grams |
|---|---|
| Vitamin $D_2$ in soybean oil having 1,000,000 units per grams | 24 |
| Gum arabic | 496 |
| Food grade stearic acid | 200 |
| Gluconic acid | 40 |
| Ammonium gluconate | 40 |

The vitamin $D_2$ and gum arabic were thoroughly admixed, and then the stearic acid, gluconic acid and ammonium gluconate were, in turn, thoroughly admixed. The block was made using a tableting press as described in Example 1. The pH was 3.5. The color was off-white, and the melting point was 62° C.

EXAMPLE 19

A nutrient block was prepared from the following materials:

| | Grams |
|---|---|
| Nicotinic acid | 100 |
| Gum arabic | 200 |
| Food grade stearic acid | 400 |
| Tartaric acid | 40 |
| Ammonium tartrate | 60 |

The block was made in a tableting press. The pH was 4.0. The color was white, and the melting point was 68° C.

EXAMPLE 20

A nutrient block was prepared from the following materials:

| | Grams |
|---|---|
| Vitamin E in oil, 900 units per gram | 4 |
| Gum arabic | 560 |
| Food grade stearic acid | 120 |
| Citric acid | 43 |
| Ammonium citrate | 73 |

The block was made in a tableting press, as previously described. The pH was 3.7. The color was off-white, and the melting point was 80° C.

EXAMPLE 21

A nutrient block was prepared from the following materials:

| | Grams |
|---|---|
| Vitamin A palmitate in corn oil 1,500,000 units per gram | 40 |
| Gum arabic | 272 |
| Food grade stearic acid | 480 |
| Citric acid | 4 |
| Ammonium citrate | 4 |

The block was made as described in Example 1. This pH was 3.9. The color was light yellow, and the melting point was 60° C.

EXAMPLE 22

A nutrient block was prepared from the following materials:

| | Grams |
|---|---|
| Ammonium selenite | 160 |
| Gum arabic | 160 |
| Stearic acid, food grade | 240 |
| Citric acid | 80 |
| Ammonium citrate | 160 |

The block was made in a tableting press as described in Example 1. The pH was 3.8. The color was off-white, and the melting point was 68° C.

EXAMPLE 23

A nutrient block was prepared from the following materials:

| | Grams |
|---|---|
| Copper carbonate | 160 |
| Ammonium citrate | 200 |
| Citric acid | 160 |
| Stearic acid | 240 |
| Gum arabic | 40 |

The ingredients were stirred together and well mixed. The mixture was then made into blocks by means of a tableting press as described in the method of Example 1. The pH was 3.5. The color was blue green, and the melting point was 68° C.

EXAMPLE 24

A nutrient block was prepared from the following materials:

|  | Grams |
|---|---|
| Zinc carbonate | 160 |
| Ammonium citrate | 180 |
| Citric acid | 140 |
| Stearic acid | 240 |
| Gum arabic | 80 |

The ingredients were stirred together and were well mixed. The mixture was then made into blocks by means of a tableting press as described in the method of Example 1. The pH was 3.8. The color was white, and the melting point was 68° C.

EXAMPLE 25

A nutrient block was prepared from the following materials:

|  | Grams |
|---|---|
| Cobalt carbonate | 156 |
| Ammonium citrate | 200 |
| Citric acid | 160 |
| Food grade stearic acid | 280 |
| Gum arabic | 4 |

The five ingredients were stirred together and well mixed. The mixture was then made into blocks by means of a tableting press as described in the method of Example 1. The pH was 3.5. The color was dark, reddish-brown, and the melting point was 63° C.

EXAMPLE 26

A nutrient block was prepared from the following materials:

|  | Grams |
|---|---|
| Biotin | 100 |
| Citric acid | 180 |
| Ammonium citrate | 240 |
| Stearic acid | 240 |
| Gum arabic | 40 |

The ingredients were stirred together and well mixed. The mixture was then made into blocks by means of a tableting press as described in the method of Example 1. The pH was 3.5. The color was white, and the melting point was 65° C.

EXAMPLE 27

A nutrient block was prepared from the following materials:

|  | Grams |
|---|---|
| Nicotinic acid (niacin) | 4 |
| Gum arabic | 200 |
| Stearic acid | 480 |
| Ammonium citrate | 66 |
| Citric acid | 50 |

This block was made in accordance with the procedure described in Example 1. The pH was 3.6. The color was off-white, and the melting point was 66° C.

EXAMPLE 28

A nutrient block was prepared from the following materials:

|  | Grams |
|---|---|
| Riboflavin | 40 |
| Gum arabic | 80 |
| Ammonium citrate | 200 |
| Citric acid | 160 |
| Food grade stearic acid | 320 |

The five ingredients were stirred together until well mixed. The mixture was then pressed into blocks by means of a tableting press as described in the method of Example 1. The pH was 3.5. The color was rust, and the melting point was 68° C.

EXAMPLE 29

|  | Grams |
|---|---|
| Vitamin K in hydrogenated corn oil (75% solution) | 80 |
| Gum arabic | 160 |
| Citric acid | 100 |
| Ammonium citrate | 120 |
| Stearic acid | 340 |

The vitamin K, in oil, was admixed with the gum arabic. Thereafter, this mixture was stirred with the citric acid, ammonium citrate and stearic acid until well mixed. The final mixture was then pressed into blocks by means of a tableting press as described in the method of Example 1. The pH was 3.5 The color was lemon yellow, and the melting point was 60° C.

It is understood that the term "nutrient composition" in the specification and claims herein, when referring to the novel compositions of this invention, includes, wherever the context so admits or requires, the nutrient blocks made from such compositions, and vice versa.

The term "wax" as used herein is used in the physical sense, as describing the appearance of the material. It is not used in the narrow chemical sense which solely embraces esters of fatty acids.

The term "stearic acid" includes commercial or chemically impure grades thereof, including food grade, wherever the context so admits or requires.

While we have described our invention in detail in its preferred embodiments, it will be obvious to those skilled in the art, after understanding our invention, that various changes and modifications may be made therein without departing from the spirit or scope thereof. We aim in the appended claims to cover all such modifications and changes.

We claim:

1. An improved, stable, weather resistant, palatable, animal saliva soluble nutrient composition in block form for supplying a single nutritive element to an animal, which consists essentially of an edible, waxy substance which is solid at ambient temperatures and which is a member seelcted from the group consisting of substantially saturated fatty acid having from about 14 to about 20 carbon atoms and mixtures thereof, ester of said substantially saturated fatty acid and mixtures thereof and alcohol corresponding to said substantially saturated fatty acid; gum arabic; and a nutritive element selected from the group consisting of (a) a cationic metallic saliva soluble chelate of citric acid and the nutritive element, (b) a cationic metallic saliva soluble mixture consisting essentially of at least one water soluble citric acid compound and the nutritive element in the form of a compound selected from the group consisting of a metal oxide, a metal hydroxide and a metal carbonate; and (c) a combination of a nonmetallic nutritive element and an edible aliphatic hydroxy acid, containing from four to six carbon atoms.

2. A composition as defined in claim 1, wherein the nutritive material is cationic metallic.

3. A composition as defined in claim 1, wherein the nutritive material is non-metallic.

4. A composition as defined in claim 3, wherein the nonmetallic nutritive material comprises an oily substance.

5. A composition as defined in claim 3, wherein the nonmetallic nutritive material is water soluble.

6. A composition as defined in claim 3, wherein the composition also contains the ammonium salt of said hydroxy acid present in the composition.

7. A composition as defined in claim 4, where said hydroxy acid is selected from the group consisting of glycolic acid, malic acid, tartaric acid, citric acid, glyconic acid and saccharic acid.

8. A composition as defined in claim 5, wherein said hydroxy acid is selected from the group consisting of glycolic acid, malic acid, tartaric acid, citric acid, glyconic acid and saccharic acid.

9. A composition as defined in claim 7, where said oily substance is an oily vitamin selected from the group consisting of vitamin A palmitate, vitamin $D_2$, vitamin $D_3$, a vitamin having vitamin E activity, and a vitamin having vitamin K activity.

10. A composition as defined in claim 8, wherein said water soluble nutrient material is selected from the group consisting of ethylene diamine dihydriodide, boric acid, ammonium selenate, riboflavin, ammonium iodide, ammonium molybdate, thiamin, nicotinic acid, folic acid, pyridoxine, pantothenic acid, biotin, erythrotin, paraminobenzoic acid and inositol.

References Cited

UNITED STATES PATENTS 3,198,635    8/1965    Anderson.

FOREIGN PATENTS 231,466    10/1959    Australia.
672,330    10/1963    Canada.
683,291    3/1964    Canada.
784,145    10/1957    England.

A. LOUIS MONACELL, Primary Examiner

NORMAN ROSKIN, Assistant Examiner